Patented Nov. 14, 1922.

1,435,416

UNITED STATES PATENT OFFICE.

FRED OTTMAN, OF JERSEY CITY, NEW JERSEY.

THERMAL INSULATOR FOR FIREPROOFING AND HEAT-CONSERVATION PURPOSES.

No Drawing.    Application filed January 26, 1920.   Serial No. 354,315.

*To all whom it may concern:*

Be it known that I, FRED OTTMAN, a resident of Jersey City, in the county of Hudson and State of New Jersey, have invented a new and useful Thermal Insulator for Fireproofing and Heat-Conservation Purposes, of which the following is a specification.

The objects of my invention are:

A. To provide an effective and reliable protection for inflammable and combustible material such as stores of explosives, volatile oils, ethers, and the like, contents of vaults, safes, etc., in the event of a destructive conflagration; to prevent loss of heat through furnace walls and conduits; and to provide a sanitary thermal insulation for places and equipment where foodstuffs are handled and stored.

B. Another object of my invention is to provide a thermal insulator of light weight and lowest possible heat conductivity, thus materially reducing weight and bulk of appliances equipped therewith.

C. A third object is to provide an insulator of lasting efficiency, which is unaffected by time and wear, non-hygroscopic, not subject to gradual deterioration, unalterable in volume and shape, and which does not exert any deleterious influence upon the materials with which it comes into close contact.

D. A further object is to reduce the costs of production by simplifying and accelerating the manufacturing processes.

As the foundation of my insulator I use diatomaceous earth or kieselguhr, a light, hard, and highly refractory silicious material of cellular structure and immense fineness. Silica, silicium dioxide, or the anhydride of silicic acid, while extremely inactive chemically under ordinary conditions, becomes very much active at elevated temperatures exerting its acid character and eagerly combining with all bases within its reach to dense and glass-like masses of silicates. The fusing temperature, at which this combination takes place, varies within a very wide range, from a low red heat for some bases to temperatures well above white heat for others, and by carefully selecting the material employed for consolidating the comminuted kieselguhr, the refractoriness of the product can easily be controlled. Proper care is necessary, however, and this constitutes one of the obstacles that have doomed to failure many attempts to utilize kieselguhr for high temperature insulation.

The highly absorbent character of the porous kieselguhr offers another serious handicap to its universal use, induces an overcharge with dense and conductive binder that clogs the vital air-cells of the material, furnishes too liberal an amount of flux for the silica, and also keeps a large amount of soluble substance, salts, out of contact with the setting agent. These substances soon begin to migrate in the product, recrystallize, and gradually but invariably break up the structure, if they are not carefully removed by expensive maceration. Many binders, by their mutual exchange of components for depositing the cementing agent, also leave behind a soluble by-product, which the porous kieselguhr tenaciously retains with similarly disastrous results; others require considerable time for hardening or maturing, often accompanied by a change in volume and shape of the product.

Organic admixtures are particularly objectionable from a sanitary point of view, harbor and breed bacteria which attract moisture, and when burnt off leave air-ducts of measurable size, through which heat is propagated by convection and radiation; the remaining ashes also furnish an additional flux for the silica.

All these peculiarities have been carefully taken into account in devising the binder for my insulator. I produce the binding or cementing agent in the mixture by the action of an acid upon an insoluble and finely powdered oxide or hydroxide. The only by-product of the reaction is water, and the size of the particles of oxide, no matter how finely it may have been ground up, prevents the same from entering and lodging in the microscopic air-cells of the kieselguhr. They merely attach themselves to the surface of the kieselguhr shells and by capillary attraction and chemical exchange absorb the fluid from the air-cells, put it to work, and keep the air-cells clear.

For the acid I have chosen the orthophosphoric. Its normal salts are very stable and all, except those of the alkalies, quite insoluble. Most, particularly those of the alkaline earths and related groups, are very difficultly, if at all, fusible. Bone ash, for instance, mainly phosphate of lime, rivals kieselguhr in refractoriness. Phosphoric acid also shares with silica the peculiarity of increased activity with rising temperature, which enables a phosphate to withstand the disintegrating attacks of silica longer than the salts of other acids. It is, however, unlike silica, sufficiently active already at ordinary temperatures to readily combine with oxides. This action of the acid, while not precipitate and leaving ample time for thoroughly mixing and moulding the material, is nevertheless prompt and definite. No additional curing or maturing of the product is required, it is ready for immediate use or shipping as soon as dry and cool. If allowed to form and set undisturbed, the binding or cementing power of the phosphates is very satisfactory, and a comparatively small amount only is required for the consolidation of fine loose material.

In producing the insulator, ground kieselguhr, the oxide or hydroxide of a base which does not readily fuse with silica,—preferably, though not necessarily, that of an alkaline earth,—and a proportionate amount of phosphoric acid are uniformly and intimately mixed, with enough water to render the mixture workable. The addition of a moderate amount of mineral fibre, preferably asbestos, is of advantage in the subsequent moulding operation. The mixture is then filled into moulds and subjected to pressure in order to remove as much of the water as can conveniently be done without rendering the product too dense. The residual moisture is finally driven off by heat. The formation of the phosphate takes place during the mixing operation, and there is no danger of losing an appreciable amount of acid under the press. By the time the draining has been accomplished, the setting of the phosphate is sufficiently advanced as to allow of removing the moulds immediately and transferring the product to the drying kiln, where the setting proceeds without further interruption and is completed while the product dries out and hardens. If occasionally for special purposes a particularly high crushing strength is required, the dry product may finally be subjected to sharp fire in fritting kilns, but as a rule the much cheaper cold setting process alone, followed by careful drying, will be sufficient and furnish a product of superior efficiency and satisfactory strength. Variations in the relative proportions of the ingredients and in the selection of the oxide used will permit of particularly accentuating one or another of the essential qualities of the product without seriously impairing others. The oxide or hydroxide must be slightly in excess over the amount required to completely engage the acid, and the reaction of the the mixture must be distinctly alkaline, or else a correction must be made. The relative proportions between silica (kieselguhr) and phosphate in the product vary, of course, with the oxide chosen. Taking calcium for an example, a mixture of about 81% by weight of kieselguhr, 9% of asbestos, and 10% of calcium phosphate will serve well. The 10 lbs. of calcium phosphate required in 100 lbs. of this mixture are obtained by adding to the 90 lbs. of kieselguhr and asbestos 6.32 lbs. of orthophosphoric acid and either 5.42 lbs. of quicklime or 7.16 lbs. of hydrated lime, with a small excess of lime in either case over these theoretical values to insure correct setting. An alkaline reaction of the mixture tells when enough lime has been added. Moulded under a reasonable pressure, this mixture will have an apparent specific gravity of about .450 when dry, stands a clear red heat without fusing, shrinking, cracking, or warping, possesses a surprisingly high thermal insulating capacity, and samples kept under close observation for years have not changed in color, size, shape, weight, or firmness, and show no traces of efflorescence. A match placed on top of a sample one inch thick, which was heated to full redness at the bottom for over two hours, did not ignite, and the wood was found scarcely discolored at the conclusion of the test. The sample itself was unaltered except for a gain in hardness at the bottom.

What I claim as new in my invention and desire to secure by Letters Patent is:

1. A refractory thermal insulating material consisting of kieselguhr as the foundation and active element, fibrous mineral matter and an insoluble and refractory normal phosphate as the binding or cementing agent.

2. A refractory thermal insulating material as set forth in claim 1 in which asbestos is used as the fibrous material.

3. A refractory thermal insulating material consisting of approximately 81% by weight of kieselguhr, 9% by weight of fibrous asbestos and 10% by weight of an insoluble and refractory normal phosphate.

4. A process of making a refractory thermal insulating material which consists in treating a mixture of kieselguhr, asbestos and an active alkaline earth metal compound with orthophosphoric acid to form an insoluble and refractory normal phosphate with the alkaline earth metal compound, said insoluble and refractory normal phosphate serving as a binder for the kieselguhr and asbestos.

FRED OTTMAN.